(12) United States Patent
Chen

(10) Patent No.: US 10,670,480 B2
(45) Date of Patent: Jun. 2, 2020

(54) THRUST TESTING DEVICES FOR LINEAR ACTUATORS

(71) Applicant: HENGDIAN GROUP INNUOVO ELECTRIC CO., LTD., Dongyang, Zhejiang Province (CN)

(72) Inventor: Yongfei Chen, Zhejiang Province (CN)

(73) Assignee: HENGDIAN GROUP INNUOVO ELECTRIC CO., LTD., Dongyang (CN)

( * ) Notice: Subject to any disclaimer, the term of this patent is extended or adjusted under 35 U.S.C. 154(b) by 60 days.

(21) Appl. No.: 16/147,835

(22) Filed: Sep. 30, 2018

(65) Prior Publication Data

US 2019/0195711 A1    Jun. 27, 2019

(30) Foreign Application Priority Data

Dec. 27, 2017    (CN) .......................... 2017 1 1440929

(51) Int. Cl.
*G01L 5/00*    (2006.01)
(52) U.S. Cl.
CPC .................................. *G01L 5/0038* (2013.01)
(58) Field of Classification Search
CPC .................................................... G01L 5/0038
USPC .................................................... 73/862.381
See application file for complete search history.

(56) References Cited

U.S. PATENT DOCUMENTS

| | | | | |
|---|---|---|---|---|
| 3,463,001 A  * | 8/1969 | Siegfried | ................... | F02K 9/96 73/112.04 |
| 4,349,192 A  * | 9/1982 | Lambert, Jr. | .... | A63B 23/03533 482/101 |
| 7,011,609 B1 * | 3/2006 | Kuo | ...................... | A63B 21/063 482/94 |
| 7,537,550 B1 * | 5/2009 | Krull | ..................... | A63B 21/063 482/94 |
| 9,079,068 B2 * | 7/2015 | Muehl | ................... | A63B 21/062 |
| 9,222,763 B2 * | 12/2015 | Singh | ..................... | G01B 5/008 |

* cited by examiner

*Primary Examiner* — Octavia Hollington
(74) *Attorney, Agent, or Firm* — Jiwen Chen

(57) ABSTRACT

An object of the present invention is to provide a thrust testing device for a linear actuator, which can test thrust more accurately and greatly reduce the working intensity of test operators. For this purpose, the present invention employs the following technical solution: a thrust testing device for a linear actuator, comprising a frame and a plurality of supporting legs used for supporting the frame, characterized in that a linear actuator mounting plate and a horizontal bearing plate, which are arranged in front of one another and spaced apart from each other, are provided on the frame; the linear actuator mounting plate is fixed to the frame; a guiderail, which is arranged in a front-rear direction of the frame, is provided on the frame, and the horizontal bearing plate is fitted on the guiderail in a sliding way; a first mounting base used for being fixed to a cabinet of the linear actuator is provided on the linear actuator mounting plate, and a second mounting base used for being fixed to a jack of the linear actuator is provided on the horizontal bearing plate; and a plurality of counterweight holders are provided on a lower side of the horizontal bearing plate, and the counterweight holders are connected to the horizontal bearing plate; and a plurality of counterweights are provided on the counterweight holders.

9 Claims, 1 Drawing Sheet

THRUST TESTING DEVICES FOR LINEAR ACTUATORS

This application claims the priority benefit of Chinese Application No. 201711440929.6, filed Dec. 27, 2017 in Chinese, which is hereby incorporated by reference.

TECHNICAL FIELD OF THE INVENTION

The present invention a thrust testing device for a linear actuator, which is used for testing thrust of a linear actuator.

BACKGROUND OF THE INVENTION

It is necessary to test various performances of linear actuators after they are well assembled, particularly thrust. As an existing thrust testing method, a linear actuator is placed vertically, with the jack facing upward; counterweights in different weight are provided at the upper end of the jack; and then the linear actuator is operated so that the jack pushes the counterweights upward. The existing thrust testing methods are very inconvenient. It is necessary to place the counterweights at the upper end of the jack, so the movement of the counterweights is inconvenient, resulting in high working intensity of the test operators.

SUMMARY OF THE INVENTION

An object of the present invention is to provide a thrust testing device for a linear actuator, which can test thrust more accurately and greatly reduce the working intensity of test operators.

For this purpose, the present invention employs the following technical solution: a thrust testing device for a linear actuator, comprising a frame and a plurality of supporting legs used for supporting the frame, characterized in that a linear actuator mounting plate and a horizontal bearing plate, which are arranged in front of one another and spaced apart from each other, are provided on the frame; the linear actuator mounting plate is fixed to the frame; a guiderail, which is arranged in a front-rear direction of the frame, is provided on the frame, and the horizontal bearing plate is fitted on the guiderail in a sliding way; a first mounting base used for being fixed to a cabinet of the linear actuator is provided on the linear actuator mounting plate, and a second mounting base used for being fixed to a jack of the linear actuator is provided on the horizontal bearing plate; and a plurality of counterweight holders are provided on a lower side of the horizontal bearing plate, and the counterweight holders are connected to the horizontal bearing plate; and a plurality of counterweights are provided on the counterweight holders.

During the test, the front and rear ends of the linear actuator are fixed to the horizontal bearing plate and the linear actuator mounting plate, respectively. The thrust of the linear actuator is tested by placing different kinds of counterweights on the counterweight holders, so the thrust can be tested more accurately. Furthermore, since the counterweight holders are arranged on the lower side of the horizontal bearing plate, the movement height of the counterweights is low. Accordingly, the working intensity of the test operators is greatly reduced.

Preferably, a horizontal shaft is provided between the horizontal bearing plate and the linear actuator mounting plate, the horizontal shaft is fixed to the frame, and a plurality of rope guide wheels are fixed on the horizontal shaft; the counterweight holders are fixedly connected to the horizontal bearing plate via a plurality of connecting ropes; and one end of the connecting rope is fixed to the horizontal bearing plate and the other end thereof extends downward to be fixed to the counterweight holder after partially surrounding the rope guide wheel. The counterweight holders are not directly fixed below the horizontal bearing plate, so the forward or backward movement of the horizontal bearing plate will not cause the shaking of the counterweight holders. Therefore, the test is more accurate.

Preferably, each of the first mounting base and the second mounting base comprises two side plates, i.e., a left side plate and a right side plate, which are arranged in opposite to each other; a positioning hole is formed on each of the side plates, which runs through the side plate in a left-right direction, and a positioning pin fitted with the positioning hole is provided; a jack through hole which radially runs through the jack is formed at a front end of the jack; a fixation base is provided on a rear side of the cabinet, and a fixation base through hole which runs through the fixation base in a left-right direction is formed on the fixation base; and a front end of the jack of the linear actuator is fixed to the second mounting base by one positioning pin, and a rear end of the cabinet of the linear actuator is fixed to the first mounting base by another positioning pin. By such an arrangement, the fixation of the linear actuator is more convenient. The linear actuator can be fixed simply by horizontally placing the linear actuator on the first mounting base and the second mounting base and then fixing by the positioning pins.

Preferably, the rope guide wheels are rotatably fixed to the horizontal shaft. With such an arrangement, the resistance against the outward extension of the jack of the linear actuator is lower, so that the thrust is tested more accurately.

Preferably, a leading edge notch is provided on a leading edge of the horizontal bearing plate, a trailing edge notch is formed on a trailing edge of the horizontal bearing plate, and an end of the connecting rope away from the counterweight holder is surrounded within the leading edge notch and the trailing edge notch of the horizontal bearing plate. Within such an arrangement, the fixation of the connecting rope is firmer and more stable.

Preferably, the frame at least comprises two fixation plates which are arranged in front of one another, and left and right ends of the linear actuator mounting plate and left and right ends of the horizontal shaft are each fixed to one fixation plate; the first mounting base is located in the middle of the linear actuator mounting plate, the second mounting base is located in the middle of the horizontal bearing plate; and one guiderail is arranged on each fixation plate, and each of left and right ends of the horizontal bearing plate is fitted with one guiderail. With such an arrangement, the structure of the testing device of the present invention becomes more stable.

Preferably, there are two counterweight holders, each of which is fixedly connected to the horizontal bearing plate by one connecting rope, and each connecting rope is fitted with one rope guide wheel. With such an arrangement, the structure of the testing device of the present invention becomes more stable.

Preferably, the counterweight holder consists of an upright rod and a supporting plate at a lower end of the upright rod, and an upper end of the upright rod is fixed to an end of the connecting rope away from the horizontal bearing plate; and each of the counterweights has an escape groove which gives way to the upright rod, the escape groove runs through the counterweight from top to bottom, and the escape groove runs through a circumferential sidewall of the counterweight.

The testing device of the present invention can test the thrust more accurately and greatly reduce the working intensity of the test operators.

DETAILED DESCRIPTION OF THE INVENTION

The present invention will be further described below by specific embodiments with reference to accompanying drawings.

Figure 1:
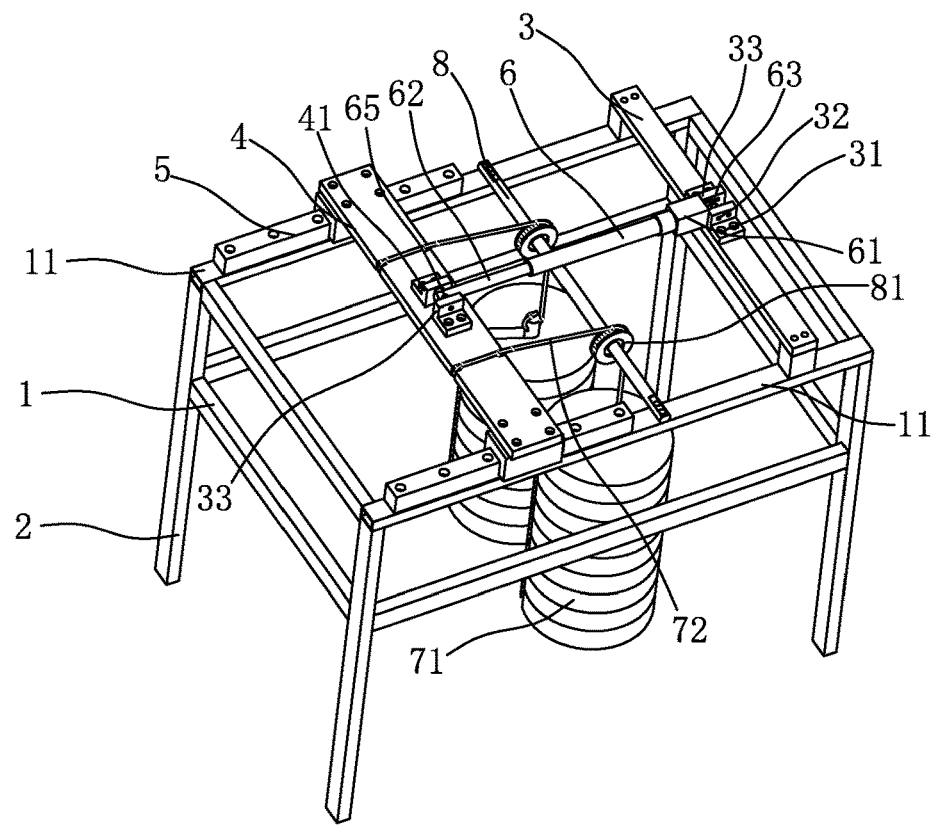
FIG. 1 is a structural diagram of the present invention.
Figure 2:
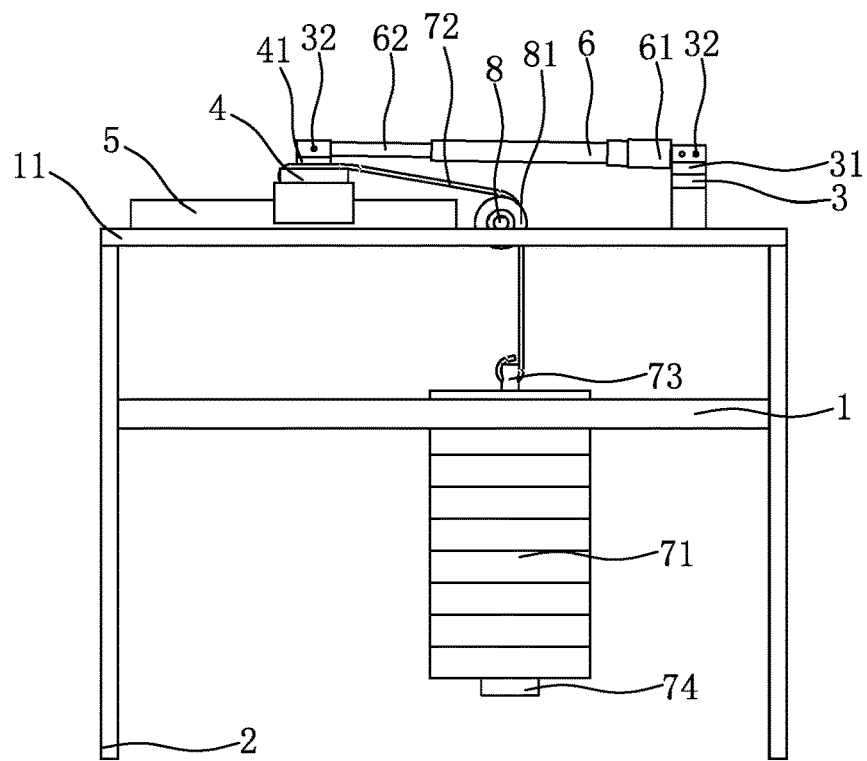
FIG. 2 is another structural diagram of the present invention.

As shown in FIG. 1 and FIG. 2, the present invention provides a thrust testing device for a linear actuator, comprising a frame 1 and a plurality of supporting legs 2 used for supporting the frame 1, wherein a linear actuator mounting plate 3 and a horizontal bearing plate 4, which are arranged in front of one another and spaced apart from each other, are provided on the frame 1; the linear actuator mounting plate 3 is fixed to the frame 1; a guiderail 5, which is arranged in a front-rear direction of the frame 1, is provided on the frame 1, and the horizontal bearing plate 4 is fitted on the guiderail 5 in a sliding way; a first mounting base 31 used for being fixed to a cabinet 61 of the linear actuator is provided on the linear actuator mounting plate 3, and a second mounting base 41 used for being fixed to a jack 62 of the linear actuator 6 is provided on the horizontal bearing plate 4; and two counterweight holders are provided on a lower side of the horizontal bearing plate 4, and the counterweight holders are connected to the horizontal bearing plate 4; and a plurality of counterweights 71 are provided on the counterweight holders.

A horizontal shaft 8 is provided between the horizontal bearing plate 4 and the linear actuator mounting plate 3, the horizontal shaft 8 is fixed to the frame 1, and two rope guide wheels 81 are fixed on the horizontal shaft 8; each of the counterweight holders is fixedly connected to the horizontal bearing plate 4 via a connecting rope 72; and one end of the connecting rope 72 is fixed to the horizontal bearing plate 4 and the other end thereof extends downward to be fixed to the counterweight holder 7 after partially surrounding the rope guide wheel 81. A leading edge notch is provided on a leading edge of the horizontal bearing plate 4, a trailing edge notch is formed on a trailing edge of the horizontal bearing plate, and an end of the connecting rope 72 away from the counterweight holder is surrounded within the leading edge notch and the trailing edge notch of the horizontal bearing plate.

The frame 1 at least comprises two fixation plates 11 which are arranged in front of one another, and left and right ends of the linear actuator mounting plate 3 and left and right ends of the horizontal shaft 8 are each fixed to one fixation plate 11; the first mounting base 31 is located in the middle of the linear actuator mounting plate 3, the second mounting base 41 is located in the middle of the horizontal bearing plate 4; and one guiderail 5 is arranged on each fixation plate 11, and each of left and right ends of the horizontal bearing plate 4 is fitted with one guiderail 5.

Each of the first mounting base 31 and the second mounting base 41 comprises two side plates 33, i.e., a left side plate and a right side plate, which are arranged in opposite to each other; a positioning hole 32 is formed on each of the side plates 33, which runs through the side plate in a left-right direction, and a positioning pin fitted with the positioning hole is provided; a jack through hole 65 which radially runs through the jack 62 is formed at a front end of the jack 62; a fixation base 63 is provided on a rear side of the cabinet 61, and a fixation base through hole which runs through the fixation base 63 in a left-right direction is formed on the fixation base 63; and a front end of the jack 62 of the linear actuator 6 is fixed to the second mounting base 41 by one positioning pin, and a rear end of the cabinet 61 of the linear actuator 6 is fixed to the first mounting base 31 by another positioning pin.

The counterweight holder consists of an upright rod 73 and a supporting plate 74 at a lower end of the upright rod 73, and an upper end of the upright rod 73 is fixed to an end of the connecting rope 72 away from the horizontal bearing plate 4; and each of the counterweights 71 has an escape groove which gives way to the upright rod 73, the escape groove runs through the counterweight from top to bottom, and the escape groove runs through a circumferential sidewall of the counterweight.

During the test, the front and rear ends of the linear actuator are fixed to the horizontal bearing plate and the linear actuator mounting plate, respectively. The thrust of the linear actuator is tested by placing different kinds of counterweights on the counterweight holders, so the thrust can be tested more accurately. Furthermore, since the counterweight holders are arranged on the lower side of the horizontal bearing plate, the movement height of the counterweights is low. Accordingly, the working intensity of the test operators is greatly reduced.

The invention claimed is:

1. A thrust testing device for a linear actuator, comprising a frame and a plurality of supporting legs used for supporting the frame, characterized in that a linear actuator mounting plate and a horizontal bearing plate, which are arranged in front of one another and spaced apart from each other, are provided on the frame; the linear actuator mounting plate is fixed to the frame; a guiderail, which is arranged in a front-rear direction of the frame, is provided on the frame, and the horizontal bearing plate is fitted on the guiderail in a sliding way; a first mounting base used for being fixed to a cabinet of the linear actuator is provided on the linear actuator mounting plate, and a second mounting base used for being fixed to a jack of the linear actuator is provided on the horizontal bearing plate; and a plurality of counterweight holders are provided on a lower side of the horizontal bearing plate, and the counterweight holders are connected to the horizontal bearing plate; and a plurality of counterweights are provided on the counterweight holders.

2. The thrust testing device for a linear actuator according to claim 1, characterized in that a horizontal shaft is provided between the horizontal bearing plate and the linear actuator mounting plate, the horizontal shaft is fixed to the frame, and a plurality of rope guide wheels are fixed on the horizontal shaft; the counterweight holders are fixedly connected to the horizontal bearing plate via a plurality of connecting ropes; and one end of the connecting rope is fixed to the horizontal bearing plate and the other end thereof extends downward to be fixed to the counterweight holder after partially surrounding the rope guide wheel.

3. The thrust testing device for a linear actuator according to claim 1, characterized in that each of the first mounting base and the second mounting base comprises two side plates including a left side plate and a right side plate, which are arranged in opposite to each other; a positioning hole is formed on each of the side plates, which runs through the side plate in a left-right direction, and a positioning pin fitted with the positioning hole is provided; a jack through hole which radially runs through the jack is formed at a front end of the jack; a fixation base is provided on a rear side of the cabinet, and a fixation base through hole which runs through the fixation base in a left-right direction is formed on the fixation base; and a front end of the jack of the linear actuator is fixed to the second mounting base by one positioning pin, and a rear end of the cabinet of the linear actuator is fixed to the first mounting base by another positioning pin.

4. The thrust testing device for a linear actuator according to claim 2, characterized in that the rope guide wheels are rotatably fixed to the horizontal shaft.

5. The thrust testing device for a linear actuator according to claim 2, characterized in that a leading edge notch is provided on a leading edge of the horizontal bearing plate, a trailing edge notch is formed on a trailing edge of the horizontal bearing plate, and an end of the connecting rope away from the counterweight holder is surrounded within the leading edge notch and the trailing edge notch of the horizontal bearing plate.

6. The thrust testing device for a linear actuator according to claim 2, characterized in that the frame at least comprises two fixation plates which are arranged in front of one another, and left and right ends of the linear actuator mounting plate and left and right ends of the horizontal shaft are each fixed to one fixation plate; the first mounting base is located in the middle of the linear actuator mounting plate, the second mounting base is located in the middle of the horizontal bearing plate; and one guiderail is arranged on each fixation plate, and each of left and right ends of the horizontal bearing plate is fitted with one guiderail.

7. The thrust testing device for a linear actuator according to claim 2, characterized in that there are two counterweight holders, each of which is fixedly connected to the horizontal bearing plate by one connecting rope, and each connecting rope is fitted with one rope guide wheel.

8. The thrust testing device for a linear actuator according to claim 2, characterized in that the counterweight holder consists of an upright rod and a supporting plate at a lower end of the upright rod, and an upper end of the upright rod is fixed to an end of the connecting rope away from the horizontal bearing plate; and each of the counterweights has an escape groove which gives way to the upright rod, the escape groove runs through the counterweight from top to bottom, and the escape groove runs through a circumferential sidewall of the counterweight.

9. The thrust testing device for a linear actuator according to claim 2, characterized in that each of the first mounting base and the second mounting base comprises two side plates including a left side plate and a right side plate, which are arranged in opposite to each other; a positioning hole is formed on each of the side plates, which runs through the side plate in a left-right direction, and a positioning pin fitted with the positioning hole is provided; a jack through hole which radially runs through the jack is formed at a front end of the jack; a fixation base is provided on a rear side of the cabinet, and a fixation base through hole which runs through the fixation base in a left-right direction is formed on the fixation base; and a front end of the jack of the linear actuator is fixed to the second mounting base by one positioning pin, and a rear end of the cabinet of the linear actuator is fixed to the first mounting base by another positioning pin.

\* \* \* \* \*